United States Patent Office 3,504,032
Patented Mar. 31, 1970

3,504,032
N - ISOBUTYL - N' - SEC - (OCTYL OR NONYL)-PHENYLENEDIAMINES
Elmar R. Altwicker, Somerville, N.J., assignor to Universal Oil Products Company, Des Plaines, Ill., a corporation of Delaware
No Drawing. Filed Aug. 25, 1966, Ser. No. 574,949
Int. Cl. C07c 87/58; C08f 45/60
U.S. Cl. 260—577                      5 Claims

ABSTRACT OF THE DISCLOSURE

N-isobutyl-N'-sec-octyl-phenylenediamines and N-isobutyl-N-'-sec-nonyl-phenylenediamines are useful stabilizing additives for rubbery polymers and other compositions normally subject to deterioration by oxygen or ozone.

---

This invention relates to a new class of compounds, to the preparational process therefor, and to compositions containing such compounds which are stabilized against deterioration caused by the action of ozone or oxygen. More particularly, this invention is directed to N,N'-dialkyl phenylenediamines where the alkyl groups are different and each has a specific configuration.

The compounds of this invention may be represented by the following general formula:

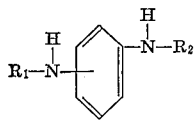

(I)

wnere $R_1$ is isobutyl of the configuration

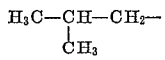

and $R_2$ is selected from the group consisting of sec-octyl and sec-nonyl. The compounds having this formula find wide utility in the chemical field, for example, as precursors for pharmaceuticals or insecticides or as antioxidants or antiozonants. Of these many uses, however, one of the more valuable present uses for these compounds is the stabilization of compositions against the deteriorating effects of oxygen or ozone. Of considerable significance in this respect is that certain of these compounds and, particularly the compounds of Formula I where $R_2$ is sec-octyl, have unusual properties for stabilizing rubbery polymers against ozone attack. In respect to this unusual property, it is quite surprising that the phenylenediamines of this invention have such high antiozonant activity. As is well known, N,N'-di substituted phenylenediamines, where the N groups may be alkyl, cycloalkyl, or phenyl, are classic compounds for use in stabilizing polymeric materials, such as rubber, against ozone attack. However, when the phenylenediamines are N substituted with alkyl groups, the most effective antiozonants usually either have both alkyl groups the same, or have only one alkyl group with the other group being cycloalkyl or phenyl. It is surprising, therefore, that the phenylenediamines of this invention, which have two different N alkyl groups, exhibit such unusually high antiozonant activity. Even more surprising, however, about the phenylenediamines of this invention is that of the two different N-alkyl substituents, one of them has an iso configuration. This is unusual because, as is well known, the activity of N,N'-dialkyl phenylenediamines is greatly affected by the configuration of the alkyl groups with the more active configuration by far usually being secondary.

Contrary to this general principle, however, the compounds of this invention which have one N-iso alkyl group, namely, isobutyl, have unusually high antiozonant activity. In fact, this activity is equal to, and even better than that for a corresponding phenylenediamine having a secondary alkyl group, and is even comparable to that for a phenylenediamine having two secondary alkyl groups.

Accordingly, an object of this invention is to provide a new class of phenylenediamines and a method of preparation therefor. Another object is to provide compositions stabilized against ozone or oxygen attack. A further object is to provide rubbery polymers stabilized against ozonolysis. These and other objects of this invention will be apparent from the following further detailed description thereof.

The compounds of this invention may be prepared in general according to the process of this invention by reductively alkylating a nitro or amino substituted phenylamine of the formula:

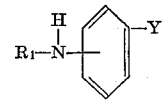

(II)

where $R_1$ has the same meaning as above and Y is selected from the group consisting of amino and nitro, with a ketone selected from the group consisting of octanone and nonanone. Examples of the nitro or amino phenylamines which may be used include: N-isobutyl-p-aminophenylamine, N-isobutyl-p-nitrophenylamine, N-isobutyl-o-aminophenylamine or N-isobutyl - o - nitrophenylamine. The phenylamines used may also be substituted on the ring with such groups as alkyl, halo or alkoxy, examples of which include N - isobutyl-p-amino - o - methylphenylamine or N-isobutyl-p-nitro-o-hydroxyphenylamine.

In effecting the reductive alkylation reaction of the phenylamine represented by Formula II above with either octanone or nonanone, the condition and procedures used may be widely varied. Generally, the conditions and procedures commonly employed in reduction alkylations of nitro or amino substituted phenylamines with ketones to prepare N,N'-di substituted phenylenediamines may be satisfactorily used for the preparation of the compounds of this invention. Typically, the reaction is effected in the presence of hydrogen and reduction catalysts. Suitable catalysts for this purpose include such catalysts as Raney nickel, palladium, platinum, platinum oxide, nickel-platinum or molybdenum as well as mixtures thereof. Such catalysts may be used with or without a support and such supports include such materials as charcoal, alumina, silica or mixtures thereof. An elevated temperature is used which generally ranges from about 90° to 300° C. using elevated hydrogen pressure ranging from about 50 to 3000 pounds per square inch. Examples of the compounds of this invention prepared according to the reductive alkylation include: N-isobutyl-N'-sec-octyl-p-phenylenediamine, N-isobutyl-N'-sec-nonyl-p-phenylenediamine, N - isobutyl-N' - sec-octyl-o-phenylene-diamine or N - isobutyl-N'-sec-nonyl-o-phenylenediamine. In the compounds of this invention, the N-isobutyl substituent may also be described as N-2-methylpropyl. Examples using this nomenclature are N-(2-methylpropyl)-N'-sec-octyl-p - phenylenediamine or N-(2-methylpropyl)-N'-sec-nonyl-p-phenylenediamine.

As hereinbefore indicated, the novel compounds of this invention are useful in stabilizing compositions against the deteriorating effects of oxygen and, more particularly ozone. The compositions which may be stabilized according to this invention by incorporation of the compounds of this invention therein, in general, comprise any material which is deleteriously affected by the action of either oxygen or, more particularly, ozone. Examples of these compositions include petroleum products, for example, unsaturated gasolines or lubricating oils; elible fats and oils, for example, linseed oil or lard; polyolefins, for example, polyethylene or polypropylene, olefin copolymers, for example, ethylene and propylene; rubbery polymers including both natural rubber and synthetic rubbers, for example, homopolymers or copolymers of butadiene, isoprene, and similar aliphatic conjugated diolefin hydrocarbons, such as butadiene-styrene copolymer rubber, butadiene-acrylonitrile copolymer rubber, butadiene-vinylpyridine copolymer rubber, isobutylene-isoprene copolymer rubber, ethylene-propylene-conjugated diolefin or non-conjugated diolefin terpolymer or polychloroprene.

Of the different compounds of this invention and the various compositions which may be stabilized by incorporation of such compounds, the most dramatic results are achieved when rubbery polymers are stabilized against ozone attack by incorporation of N-isobutyl-N'-sec-octyl-p-phenylenediamine. Accordingly, a rubbery polymer containing this compound, which is stabilized against ozone deterioration, is a particularly preferred composition of this invention. The compounds of this invention may be added to the above illustrated class of compositions, either individually or in admixture, according to any of the standard procedures commonly used for incorporating antiozonants or antioxidants into polymeric materials. These compositions may also, if desired, contain additional conventional antioxidants or antiozonants which, in combination with the compounds of this invention, may result in the formation of synergistic compositions. The amount of the compounds of this invention added to stabilize the compositions may be widely varied with the particular amount added being dependent upon such factors as the particular composition being stabilized, the particular stabilizing compound or compounds being added and whether the composition is being stabilized against oxidation or ozonolysis or both. For example, in the instance where rubbery polymers are being stabilized against ozonolysis, the amount of the compound added usually ranges from about 0.05 to 10 weight parts per 100 weight parts of the rubbery polymer, with from about 0.1 to 5 weight parts per 100 weight parts usually being preferred.

The following examples are cited to illustrate the novel compounds of this invention, the preparational process therefor and the stabilized compositions containing such compounds. They are not, however, intended to limit the broad scope of this invention to the specific compounds and compositions illustrated therein.

EXAMPLE I

N - isobutyl - N'-sec-octyl-p-phenylenediamine was prepared by the process of this invention according to the following procedure:

About 9.5 grams of N-isobutyl-p-nitrophenylamine, 13 grams of 2-octanone, 1 gram of a 5 percent palladium on charcoal catalyst and 400 milliliters of xylene were charged to an autoclave. The autoclave was pressured to about 800 pounds per square inch and heated to about 168° C. The reaction was continued until the desired quantity of hydrogen had been adsorbed, a period requiring about 4 hours. The autoclave was then cooled and the contents removed, filtered to separate the catalyst, and then fractionated to recover the desired product boiling at 175° to 180° C. at 2 mm. Hg.

EXAMPLE II

N-isobutyl-N'-sec-nonyl - p - phenylenediamine is prepared by the process of this invention according to the procedure of Example I using nonanone in place of octanone.

EXAMPLE III

The compounds of this invention were evaluated as antiozonants as follows.

An SBR sidewall stock rubber of the recipe—

| Ingredients: | Parts by wt. |
|---|---|
| SBR 1502 | 100.00 |
| Furnex | 10.00 |
| Statex M | 30.00 |
| Zinc oxide | 3.00 |
| Stearic acid | 2.00 |
| Sulfur | 2.00 |
| Santocure | 1.25 |
| Antiozonant additive | As indicated | was cured for 40 minutes at 140° C. and then cut into test strips of 1 inch by 4 inches. Different series of the test strips were then elongated 10%, 15%, 20% and 30%, respectively, and the elongated strips were mounted on panels. The panels were placed in an ozone cabinet and subjected to an atmosphere containing 50 parts of ozone per 100 million parts of air at 100° F. and the time to first crack is noted. The results of these evaluations, as compared to the results obtained for samples of the same rubber containing other antiozonant additives, are reported in the following table. The code used for the samples in the table is as follows:

| Sample code number | p-Phenylenediamine antiozonant | |
|---|---|---|
| | N substituent | N' substitutent |
| 1—A and B | Isobutyl | Sec-octyl |
| 2—A and B | Sec-butyl | Do. |
| 3—A and B | n-Butyl | Do. |
| 4—A and B | t-Butyl | Do. |
| 5—A and B | Sec-butyl | Sec-butyl. |
| 6—A and B | Sec-octyl | Sec-octyl. |
| 7—A and B | 1,3-dimethyl-butyl | Phenyl. |

In the table, the A samples represent rubber samples where the concentration of antiozonant additive is 1.75 parts by weight per 100 parts of rubber and the B samples represent rubber samples where the concentration is 2.00 parts.

| Sample | Hours to first crack elongation | | | |
|---|---|---|---|---|
| | 10% | 15% | 20% | 30% |
| 1—A | >144 | Flaw | >144 | >144 |
| B | >144 | >144 | >144 | >144 |
| 2—A | >144 | >144 | >144 | 8–24 |
| B | >144 | >144 | >144 | >144 |
| 3—A | >144 | 7–24 | 48–72 | 2–4 |
| B | >144 | >144 | >144 | >144 |
| 4—A | 24–32 | 2–3 | 2–3 | 1–2 |
| B | 72–144 | >144 | 2–3 | 1–2 |
| 5—A | >144 | >144 | >144 | >144 |
| B | >144 | >144 | >144 | >144 |
| 6—A | >144 | 8–24 | 4–6 | 1–2 |
| B | >144 | >144 | >144 | 2–3 |
| 7—A | 2–3 | 1–3 | 1–2 | 0–1 |
| B | >144 | 2–3 | 1–2 | 0–1 |

It may be observed from the data in the above table that a compound of this invention (Samples 1A and B), having an N-isobutyl substituent, has antiozonant activity comparable, if not superior, to a corresponding compound (Samples 2A and B), having an N-secondary butyl group. This, as explained above, is quite surprising because, according to present theory, a phenylenediamine having an N-alkyl substituent with a secondary configuration normally would be expected to have antiozonant activity superior to a similar compound having the N-alkyl group with an iso configuration. Of significance in this respect is that this same compound, with one N-isobutyl substituent, even has antiozonant activity comparable to a compound (Samples 5A and B) having both N and N' substituents as secondary butyl.

I claim as my invention:

1. A compound of the formula:

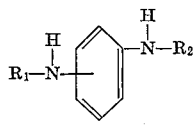

where $R_1$ is isobutyl and $R_2$ is selected from the group consisting of sec-nonyl and sec-octyl.

2. The compound according to claim 1 characterized in that the $R_1NH$ and $R_2NH$ groups are located in para position.

3. The compound according to claim 1 characterized in that $R_2$ is sec-octyl.

4. The compound according to claim 1 characterized in that it is N-isobutyl-N'-sec-octyl-p-phenylenediamine.

5. The compound according to claim 1 characterized in that it is N-isobutyl-N'-sec-nonyl-p-phenylenediamine.

References Cited

UNITED STATES PATENTS

| | | | |
|---|---|---|---|
| 2,381,015 | 8/1945 | Bramer et al. | 260—577 |
| 2,498,630 | 2/1950 | Thompson | 260—577 X |
| 2,867,604 | 6/1955 | Rosenwald et al. | 260—577 X |
| 3,209,030 | 9/1965 | Bicek | 260—577 X |

CHARLES B. PARKER, Primary Examiner

CHARLES F. WARREN, Assistant Examiner

U.S. Cl. X.R.

260—45.9